(12) United States Patent
Gupta et al.

(10) Patent No.: US 11,999,809 B2
(45) Date of Patent: Jun. 4, 2024

(54) GRAFT COPOLYMERS OF DEXTRAN AND POLYACRYLAMIDE AND METHODS OF MAKING AND USING SAME

(71) Applicant: FermWorx, LLC, Columbus, GA (US)

(72) Inventors: D. V. Satyanarayana Gupta, Columbus, GA (US); Michael Joseph Rubal, Columbus, GA (US); Derek Christopher Mouton, Columbus, GA (US)

(73) Assignee: FERMWORX, LLC, Columbus, GA (US)

( * ) Notice: Subject to any disclaimer, the term of this patent is extended or adjusted under 35 U.S.C. 154(b) by 0 days.

(21) Appl. No.: 17/837,946

(22) Filed: Jun. 10, 2022

(65) Prior Publication Data

US 2023/0399447 A1 Dec. 14, 2023

(51) Int. Cl.
*C08F 251/00* (2006.01)
(52) U.S. Cl.
CPC .................................. *C08F 251/00* (2013.01)

(58) Field of Classification Search
CPC ............ C08B 37/00; C08B 37/02; C08L 5/02
See application file for complete search history.

(56) References Cited

U.S. PATENT DOCUMENTS 3,734,820 A * 5/1973 Hoover et al. ......... D21H 17/24
162/168.3

* cited by examiner

*Primary Examiner* — Robert D Harlan
(74) *Attorney, Agent, or Firm* — Kean Miller LLP; Robert Devin Ricci; Brian J. Servé

(57) ABSTRACT

Disclosed herein are new graft copolymers of dextran and polyacrylamide. The graft copolymers can include dextran, where the dextran is a backbone polymer including about 15 wt % to about 50 wt % of the graft copolymer; and polyacrylamide, where the polyacrylamide is a side chain polymer including about 50 wt % to about 85 wt % of the graft copolymer, based on the total weight of the graft copolymer, where the graft copolymer has a weight-average molecular weight from about 1,000,000 g/mol to about 1,500,000 g/mol. The graft copolymers of dextran and polyacrylamide can be used as friction reducers for well treatment fluids.

3 Claims, 5 Drawing Sheets

Table 1: Summary of Reaction Examples

| Reaction | Dextran (g) | 40% Acrylamide Solution (mL) | DI-water (mL) | Ammonium cerium(IV) nitrate (g) | Nitric acid (M) | Nitric acid (mL) | DI-Water (Addition Funnel) (mL) | Reaction Time (h) | Reaction Temp. (°C) | DI-water (Dilution) (mL) | Gel | Conversion (%) | Yield (g) | Yield (%) | $M_n$ | $M_w$ | PDI |
|---|---|---|---|---|---|---|---|---|---|---|---|---|---|---|---|---|---|
| NA | Starting | NA | NA | NA | NA | NA | NA | NA | NA | NA | NA | NA | NA | NA | | | |
| 1 | 1.9442 | 3.2 | 200 | 0.0345 | 0.5 | 1.0000 | NA | 3 | 22 | NA | None | Low | 1.9 | 57.7 | 244518 | 928362 | 3.71 |
| 2 | 1.9492 | 3.2 | 200 | 0.1715 | 0.5 | 1.0000 | NA | 3 | 22 | NA | None | Low | 1.9 | 58.3 | 265747 | 760041 | 2.80 |
| 3 | 1.0000 | 20.0 | 100 | 0.0203 | 1 | 0.585 | NA | 3 | 28 | 150 | Yes (reversible) | 47.4 | 8.0 | 89.0 | | | |
| 4 | 1.0000 | 20.0 | 100 | 0.0208 | 1 | 0.585 | NA | 4 | 28 | 250 | Yes | 76.5 | 11.6 | 128.8 | 1478862 | 8033804 | 5.47 |
| 5 | 1.0816 | 20.0 | 100 | 0.0208 | 1 | 0.585 | 100 | 3 | 28 | 200 | None | 68.2 | 14.4 (4.7) | 160.0 (52.3) | | | |
| 6 | 11.1137 | 223.0 | 1111 | 0.2234 | 1 | 6.500 | 1111 | 3 | 31 | 1111 | None | 68.3 | 72.0* | 80.8* | 320511 | 1142500 | 3.57 |

FIGURE 1

GRAFT COPOLYMERS OF DEXTRAN AND POLYACRYLAMIDE AND METHODS OF MAKING AND USING SAME

BACKGROUND

Field

Disclosed herein are graft copolymers of dextran and polyacrylamide. These graft copolymers can be used as friction reducers for well treatment compositions, which can be used to hydraulically fracture subterranean formations to increase hydrocarbon production.

Description of the Related Art

Boreholes in subterranean formations are often treated by hydraulic fracturing to increase their conductivity to enhance recovery of hydrocarbons. The fracturing procedure increases flow by creating new fissures and facilitating the connectivity of the existing pores and natural channels contained in a reservoir rock that would otherwise not allow adequate flow to reach the wellbore in sufficient quantities for commercial value.

Hydraulic fracturing cracks or "fractures" in the adjacent substrate or zone are created by forcing a fluid at a rate and pressure that exceeds the parting pressure of the rock. The continued injection of the fracturing fluid expands the fractures. As the pumping pressure at the surface is released, the "frac" fluid will retreat from the formation back to the well. Proppant incorporated in the fluids is left behind and acts to prevent the expanded fractures from closing, allowing the conductive channels to remain. Viscosity of fracturing fluids is important for transporting the proppant material into the fractures. Poor or low viscosity can lead to "premature screen out," whereby the proppant drops out in the wellbore or fracture, significantly impairing the ability to extend the fractures deeper into the formation. High viscosity of the fluids is required to transport most proppant, especially high concentration of proppant, and this viscosity is typically achieved by cross-linking polymer solutions.

Slickwater fracturing, different from fracturing using cross-linked fluids, has been developed and used in tight gas sand reservoirs since successful operations in the Cotton Valley Sand in East Texas in 1997. Because of the very low viscosity of the fluid, the operations achieve proppant transport by increasing pumping rates and pressure, which causes significant energy loss due to friction between tubular goods and the turbulent fluid flow. This requires extra energy (hydraulic horsepower) to compensate the energy loss. High molecular weight (typically over 10 M) polymers are used as friction reducers to minimize the energy loss by changing turbulent flow to laminar flow via interactions with eddies of turbulent flow.

Friction reducers are normally added to the frac fluids "on the fly" as water-in-oil emulsions. In such emulsions, active polymer molecules are packed inside water droplets dispensed in the continuous oil phase. When friction reducers are pumped into water, the emulsion inverts to oil-in-water emulsion, releasing the polymer, which swells (hydrates). The hydrated, disentangled polymer molecules then work as a friction reducer. The speed of the inversion and hydration is very important for practical application: fluid pumped at 100 bbl/min in a 5.5-in. tubular travels from surface to 15,000 ft (MD) in less than 3 min. The longer the hydration time, the fewer friction reducer molecules function at their full potential in the tubulars, and the more energy required to overcome friction losses.

Currently, most friction reducers are polyacrylamide (PAM) based copolymers. Acrylic acid and 2-Acrylamido-2-methylpropane sulfonic acid (AMPS) are typically incorporated to improve hydration properties and compatibility with different water sources. The molecular weight (MW) of commercial polyacrylamide ranges from $10^5$ to $>10^7$ Da. High MW PAM ($>10^6$ Da) has a wider range of applications due to its high viscosity, drag reduction capabilities, and water retention characteristics. Polyacrylamide is widely used in environmental systems including in addition to friction reducers as a viscosity enhancer in enhanced oil recovery (EOR), as a flocculant in water treatment and sludge dewatering and as a soil conditioning agent in agricultural applications and other land management practice. Low molecular weight polyacrylamide is also used as scale inhibitor to prevent the precipitation of calcium and magnesium salts in oilfield tubulars, formations, and industrial settings.

The concentration of the proppant in slickwater fracturing is relatively low (<2 pounds of proppant added), and it typically is carried in a large volume of fluid. A typical slickwater treatment pumps 1.0 to 2.5 million gal of water. For a horizontal well treatment, the volume could be several folds higher. Since friction reducers are added at certain concentrations throughout the treatment, cumulative volumes of friction reducers can be significant.

When slickwater fracturing was new, operations were smaller than they are now. Because relatively little friction reducer was utilized in those jobs, there was little concern about polymer damage to the formation. However, now with millions of gallons of water and thousands of gallons of polymer pumped in one treatment, the high molecular weight polymers can concentrate in fracture surfaces and in the proppant pack, which can impair productivity. Polyacrylamide degradation studies have been reported to illustrate the issues.[1,2]

All current commercial friction reducers, including copolymers, are vinyl polymers with C—C backbones, which are very difficult to break. Polyacrylamide degrades chemically and biologically, but chemical or enzymatic hydrolysis of the amide group does not break the backbone of the polymer and therefore does not meaningfully reduce the molecular weight. In addition, PAM has remarkable thermal stability, and pyrolytic decomposition of the main chain does not occur at temperatures below 300° C.

The most effective method to reduce vinyl polymer molecular weight is "chain-scission" via radical degradation. Agents used in this method are inorganic and organic peroxides, or persulfates. However, this type of degradation proceeds randomly and typically requires high temperature. Undesirable chain transferring occurs frequently, causing degradation of a certain chain to terminate prematurely. In addition, radical coupling can occur, causing virtual cross-linking that actually increases molecular weight and can cause even more formation damage.

Consequently, there is need for new friction reducers that can be included in well treatment compositions.

SUMMARY

Provided herein are graft copolymer that can be used in well treatment compositions. In a specific embodiment, a graft copolymer can include dextran, where the dextran is a backbone polymer including about 15 wt % to about 50 wt % of the graft copolymer, based on the total weight of the graft copolymer; and polyacrylamide, where the polyacrylamide is a side chain polymer including about 50 wt % to about 85 wt % of the graft copolymer, based on the total weight of the graft copolymer, wherein the graft copolymer has a weight-average molecular weight from about 1,000,000 g/mol to about 1,500,000 g/mol.

In another specific embodiment, a method of making a graft copolymer that includes contacting acrylamide monomers, dextran, and a radical initiator to make the graft copolymer, where the radical initiator is ceric nitrate, and where the graft copolymer has a weight-average molecular weight from about 1,000,000 g/mol to about 1,500,000 g/mol.

In another specific embodiment, a well treatment composition that includes a graft copolymer of dextran and polyacrylamide, where the dextran is a backbone polymer including about 15 wt % to about 25 wt % of the graft copolymer, based on the total weight of the graft copolymer; and polyacrylamide, where the polyacrylamide is a side chain polymer including about 75 wt % to about 85 wt % of the graft copolymer, based on the total weight of the graft copolymer, wherein the graft copolymer has a weight-average molecular weight from about 1,000,000 g/mol to about 1,500,000 g/mol; an additive, where the additive is selected from a list including: one or more friction reducers, one or more viscosifiers, one or more breakers, one or more acids, one or more base, one or more salts, one or more biocides, one or more scale inhibitors, one or more deflocculants, one or more proppants, one or more surfactants, one or more chelating agents, one or more alcohols, one or more emulsifiers, one or more non-emulsifiers, one or more mineral control agents, one or more silt suspenders, one or more corrosion inhibitors, one or more foaming agents, one or more antifoam agents, one or more $H_2S$ scavengers, one or more $O_2$ scavengers, one or more crosslinking agents, one or more surface tension reducers, one or more buffers, one or more clay stabilizers, one or more fluid loss additives, one or more temperature stabilizers, one or more diverting agents, one or more paraffin inhibitors, and one or more asphaltene inhibitors; and water, where the well treatment composition has a weight percent of the graft copolymer of dextran and polyacrylamide from about 0.12 to about 0.36.

In another specific embodiment, a method of fracturing a subterranean formation that includes injecting a well treatment composition into a wellbore, where the well treatment composition includes: graft copolymer of dextran and polyacrylamide, where the dextran is a backbone polymer comprising about 15 wt % to about 25 wt % of the graft copolymer, and where the polyacrylamide is a side chain polymer comprising about 75 wt % to about 85 wt % of the graft copolymer, based on the total weight of the graft copolymer, where the graft copolymer has a weight-average molecular weight from about 1,000,000 g/mol to about 1,500,000 g/mol; and where the well treatment composition has a weight percent of the graft copolymer of dextran and polyacrylamide from about 0.12 to about 0.36.

BRIEF DESCRIPTION OF THE DRAWINGS

The present disclosure can be better understood by referring to the following drawings. The drawings constitute a part of this specification and include exemplary embodiments of the graft copolymer compositions, which can be embodied in various forms.

FIG. 1 is a table of the reaction examples.

DETAILED DESCRIPTION

Figure 2:
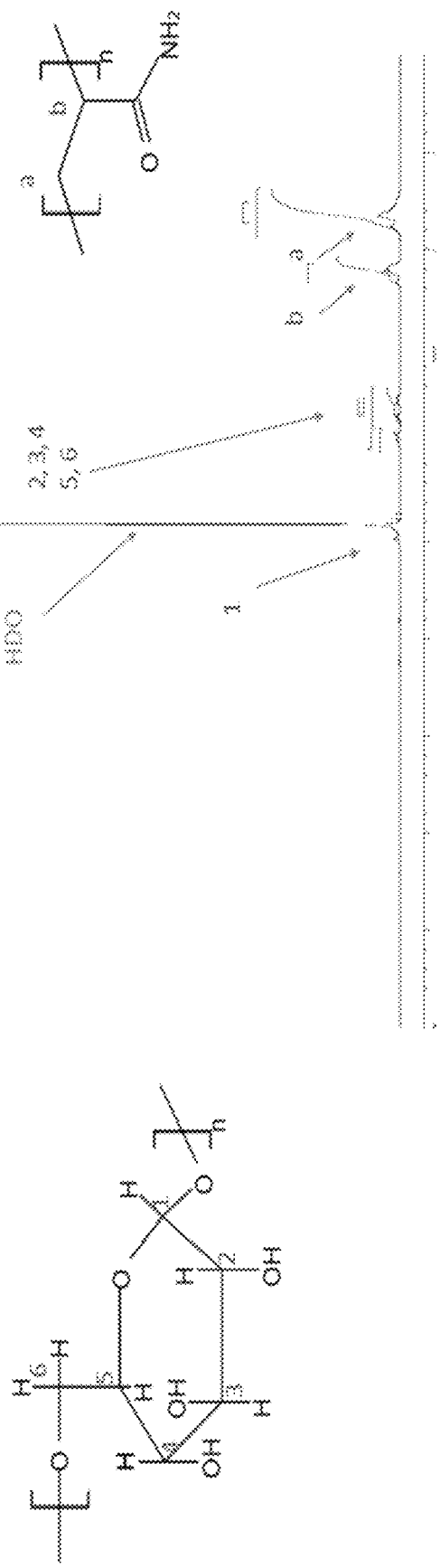
FIG. 2 is a $^1H$ NMR spectrum of a graft copolymer of dextran and polyacrylamide.
Figure 3:
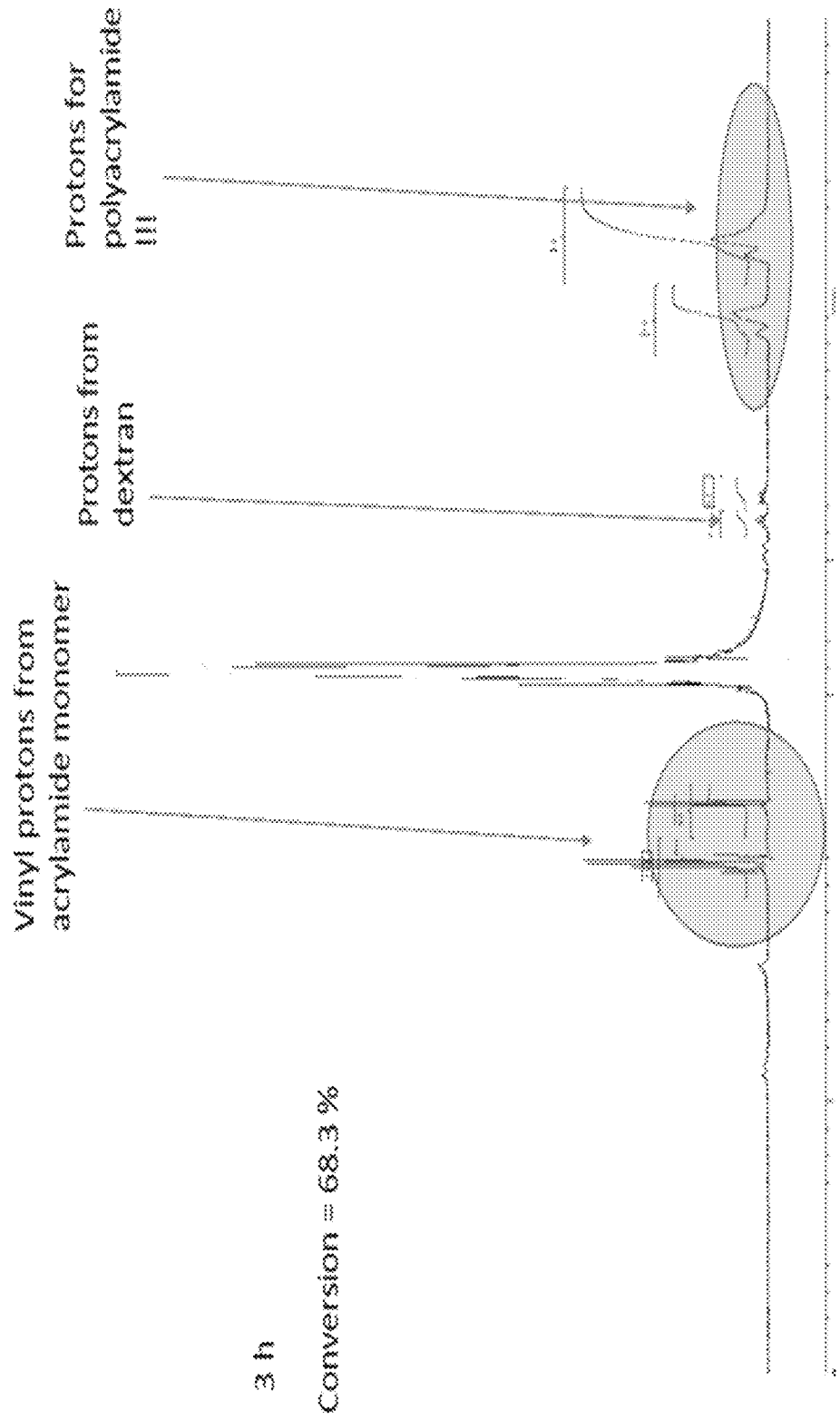
FIG. 3 is a $^1H$ NMR spectrum of a graft copolymer of dextran and polyacrylamide at 3 hours of reaction time.
Figure 4:
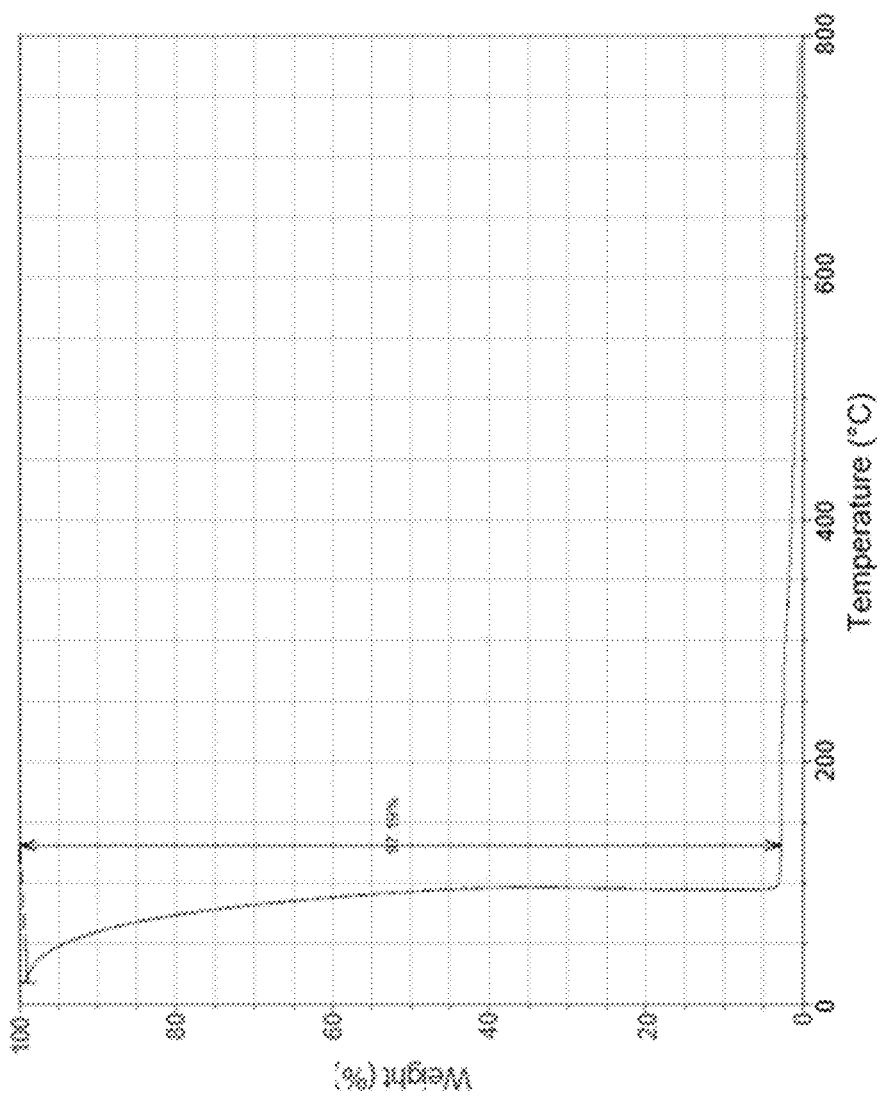
FIG. 4 a graph of a thermogravimetric analysis of a graft copolymer of dextran and polyacrylamide.
Figure 5:
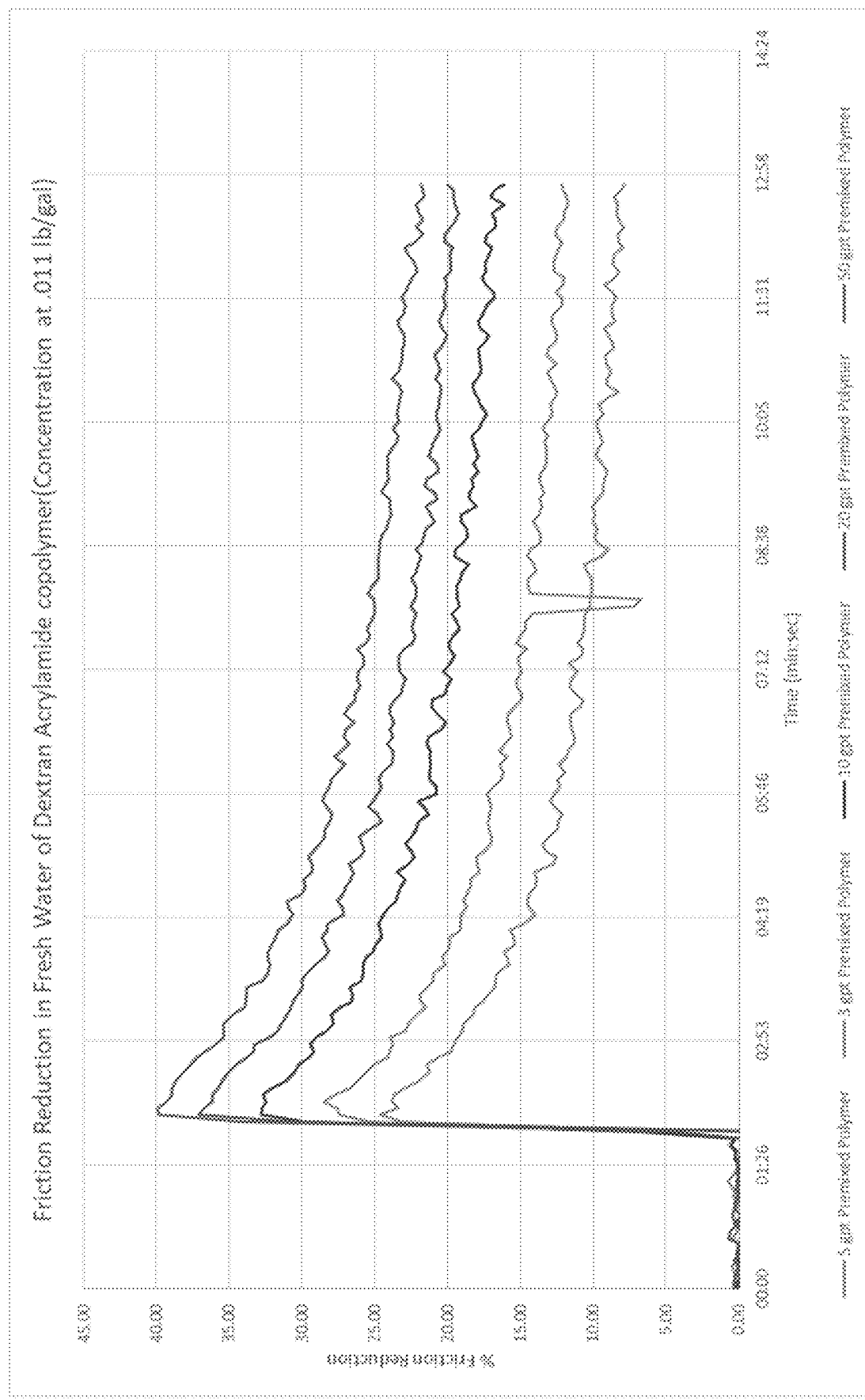
FIG. 5 is graph depicting the friction reduction in fresh water at various concentrations of a solution of graft copolymer of dextran and polyacrylamide at a concentration of 0.011 lb/gal.

Disclosed herein are new graft copolymers of dextran and polyacrylamides. These new graft copolymers can be used as friction reducers in fracturing fluids. The graft copolymers can have easily breakable bonds, which can enable clean, non-damaging slickwater stimulations. The new graft copolymers can allow the polymer backbone more susceptible to oilfield oxidizer breakers so that the degradation proceeds in an ordered, predictable fashion and leaves less or no residue, thus less or no formation damage. This new non-damaging friction reducer is also delivered in water solution form for the ease of transportation and field operation and does not require the inversion and hydration of emulsions and is also environmentally sustainable. The product can also be dried to a powder form and added to water or brine in the field. The same chemistry can be used in other applications cited above where clean environmental profile is warranted.

The graft copolymer of dextran and polyacrylamide can include a backbone polymer of dextran and side chain polymers of polyacrylamide. The side chain polymers of polyacrylamide can include one or more acrylamide monomers. The graft copolymer of dextran and polyacrylamide can have a ratio of the dextran weight percent to the polyacrylamide weight percent that can vary widely. For example, the graft copolymer of dextran and polyacrylamide can have a ratio of dextran weight percent to polyacrylamide weight percent from about 80 wt % to about 90 wt % of dextran to about 10 wt % to about 20 wt % of polyacrylamide, about 10 wt % to about 20 wt % of dextran to about 80 wt % to about 90 wt % of polyacrylamide, about 70 wt % to about 82 wt % of dextran and about 18 wt % to about 30 wt % of polyacrylamide, about 15 wt % to about 25 wt % of dextran and about 75 wt % to about 85 wt % of polyacrylamide, about 15 wt % to about 50 wt % of dextran and about 50 wt % to about 85 wt % of polyacrylamide, about 18 wt % to about 30 wt % of dextran and about 82 wt % to about 90 wt % of polyacrylamide, about 89 wt % to about 95 wt % of dextran and about 5 wt % to about 11 wt % of polyacrylamide, about 5 wt % to about 11 wt % of dextran and about 89 wt % to about 95 wt % of polyacrylamide, based on the total weight of the graft copolymer of dextran and polyacrylamide. In another example, the copolymer of dextran and polyacrylamide can have a weight percent of the grafted acrylamide monomer from about 0.01 wt % to about 20.0 wt %, about 0.01 wt % to about 80.0 wt %, about 1.0 wt % to about wt %, about 2.0 wt % to about 10.0 wt %, or about 3 wt % to about 15.0 wt %, based on the total weight of the graft copolymer of dextran and polyacrylamide.

The graft copolymer of dextran and polyacrylamide can include polyacrylamides of varying chain lengths and molecular mass. For example, the graft copolymer of dextran and polyacrylamide can have polyacrylamides chain lengths from a low of about 3 g/mol, about 10 g/mol, or about 20 g/mol, to a high of about 100 g/mol, about 150 g/mol, or about 200 g/mol. In another example, the graft copolymer of dextran and polyacrylamide can have polyacrylamides chain lengths from about 3 g/mol to about 200 g/mol, about 5 g/mol to about 100 g/mol, about 6 g/mol to about 180 g/mol, about 20 g/mol to about 90 g/mol, about 30 g/mol to about 120 g/mol, about 105 g/mol to about 107 g/mol, or about 24 g/mol to about 150 g/mol.

The graft copolymer of dextran and polyacrylamide can have a number-average molecular weight ($M_n$) that varies widely. For example, the graft copolymer of dextran and polyacrylamide can have a number-average molecular weight from a low of about 18,000 g/mol, about 20,000 g/mol, or about 23,000 g/mol, to a high of about 150,000 g/mol, about 170,000 g/mol, or about 200,000 g/mol. In another example, the graft copolymer of dextran and polyacrylamide can have a number-average molecular weight from about 19,000 g/mol to about 190,000 g/mol, about 20,000 g/mol to about 150,000 g/mol, about 23,000 g/mol to about 40,000 g/mol, about 24,000 g/mol to about 100,000 g/mol, about 70,000 g/mol to about 135,000 g/mol, about 26,747 g/mol to about 147,862 g/mol, or about 60,000 g/mol to about 160,000 g/mol.

The graft copolymer of dextran and polyacrylamide can have a weight-average molecular weight ($M_w$) that varies widely. For example, the graft copolymer of dextran and polyacrylamide can have a weight-average molecular weight from a low of about 50,000 g/mol, about 60,000 g/mol, or about 70,000 g/mol, to a high of about 800,000 g/mol, about 1,000,000 g/mol, or about 1,500,000 g/mol. In another example, the graft copolymer of dextran and polyacrylamide can have a weight-average molecular weight from about 50,000 g/mol to about 900,000 g/mol, about 55,000 g/mol to about 850,000 g/mol, about 60,000 g/mol to about 800,000 g/mol, about 100,000 g/mol to about 700,000 g/mol, about 170,000 g/mol to about 535,000 g/mol, about 76,941 g/mol to about 803,904 g/mol, about 70,000 g/mol to about 660,000 g/mol, about 700,000 g/mol to about 1,000,000 g/mol, about 1,000,000 g/mol to about 1,200,000 g/mol, about 800,000 g/mol to about 1,300,000 g/mol, or about 1,000,000 g/mol to about 1,500,000 g/mol, The graft copolymer of dextran and polyacrylamide can have a higher-average molecular weight ($M_z$) that varies widely. For example, the graft copolymer of dextran and polyacrylamide can have a higher-average molecular weight from a low of about 150,000 g/mol, about 260,000 g/mol, or about 300,000 g/mol, to a high of about 900,000 g/mol, about 1,000,000 g/mol, or about 1,600,000 g/mol. In another example, the graft copolymer of dextran and polyacrylamide can have a higher-average molecular weight from about 150,000 g/mol to about 900,000 g/mol, about 160,000 g/mol to about 1,500,000 g/mol, about 260,000 g/mol to about 900,000 g/mol, about 100,000 g/mol to about 1,000,000 g/mol, about 170,000 g/mol to about 535,000 g/mol, about 216,246 g/mol to about 1,438,250 g/mol, about 800,000 g/mol to about 1,500,000 g/mol, or about 700,000 g/mol to about 1,590,000 g/mol.

The graft copolymer of dextran and polyacrylamide can have a molecular weight of the highest peak ($M_p$) that varies widely. For example, the graft copolymer of dextran and polyacrylamide can have a molecular weight of the highest peak from a low of about 35,000 g/mol, about 40,000 g/mol, or about 45,000 g/mol, to a high of about 900,000 g/mol, about 1,000,000 g/mol, or about 1,600,000 g/mol. In another example, the graft copolymer of dextran and polyacrylamide can have a molecular weight of the highest peak from about 35,000 g/mol to about 900,000 g/mol, about 36,000 g/mol to about 150,000 g/mol, about 40,000 g/mol to about 1,000,000 g/mol, about 100,000 g/mol to about 1,000,000 g/mol, about 170,000 g/mol to about 535,000 g/mol, about 43,953 g/mol to about 1,047,055 g/mol, about 170,000 g/mol to about 535,000 g/mol, about 216,246 g/mol to about 1,438,250 g/mol, about 800,000 g/mol to about 1,500,000 g/mol, or about 700,000 g/mol to about 1,590,000 g/mol.

The graft copolymer of dextran and polyacrylamide can have a polydispersity index that varies widely. For example, the graft copolymer of dextran and polyacrylamide can have a polydispersity index from a low of about 0.90, about 1.00, or about 2.00, to a high of about 5.00, about 6.00, or about 10.0. In another example, the graft copolymer of dextran and polyacrylamide can have a polydispersity index from about 1.00 to about 3.00, about 2.00 to about 4.00, about 1.50 to about 6.00 g/mol, about 2.00 to about 5.50, about 2.00 to about 6.50, or about 2.5 g/mol to about 3.5 g/mol.

The graft copolymer of dextran and polyacrylamide can be provided in an aqueous solution, dispersion, or slurry. The graft copolymer of dextran and polyacrylamide in an aqueous slurry can have a widely varying solids content. For example, the graft copolymer of dextran and polyacrylamide in an aqueous slurry can have a solids content from a low of about 5 wt %, about 10 wt %, or about 30 wt %, to a high of about 70 wt %, about 80 wt %, or about 95 wt %. In another example, the graft copolymer of dextran and polyacrylamide in an aqueous slurry can have a solids content greater than about 50 wt %, about 55 wt %, or about 70 wt %. In another example, the graft copolymer of dextran and polyacrylamide in an aqueous slurry can have a solids content from about 5 wt % to about 95 wt %, about 20 wt % to about 70 wt %, about 40 wt % to about 60 wt %, about 45 wt % to about 55 wt %, about 47 wt % to about 54 wt %, about 30 wt % to about 54 wt %, about 33 wt % to about 48 wt %, about 51 wt % to about 54 wt %, or about 50 wt % to about 60 wt %. The weight percent of the solids content of the graft copolymer of dextran and polyacrylamide can be based on the total weight of the composition or based on the total weight of the graft copolymer of dextran and polyacrylamide and water.

The one or more acrylamides monomers can include, but are not limited to: acrylamide, N-substituted acrylamide; N,N-substituted acrylamide; N,N-dimethylacrylamide, and mixtures thereof. The acrylamide monomer can be anionic, cationic, zwitterionic, amphoteric, or nonionic.

The dextran can include a polymer with branched poly-α-d-glucosides of microbial origin having glycosidic bonds predominantly C1→C6. For example, the dextran main chain can include α-1,6 glycosidic linkages between glucose monomers with branches from α-1,3 linkages.

The dextran can have a molecular mass that varies widely. For example, the dextran can have a molecular mass from a low of about 100,000 g/mol, about 200,000 g/mol, or about 300,000 g/mol, to a high of about 400,000 g/mol, about 700,000 g/mol, or about 1,500,000 g/mol. In another example, the dextran can have a molecular mass from about 100,000 g/mol to about 1,500,000 g/mol, about 150.00 g/mol to about 370,000 g/mol, about 330.00 g/mol to about 360,000 g/mol, about 250.00 g/mol to about 550,000 g/mol, about 300.00 g/mol to about 1,000,000 g/mol.

The graft copolymers of dextran and one or more acrylamides polymers can be made by various methods or reaction schemes. For example, the method of making the graft copolymers of dextran and polyacrylamide can include, but is not limited to, contacting one or more acrylamide monomers with one or more dextrans to make the graft copolymer. In another example, the method of making the graft copolymers of dextran and polyacrylamide can include, but is not limited to, contacting one or more acrylamide monomers, one or more dextrans, and one or more catalysts or redox initiators to make the graft copolymer. In an embodiment, the method of making the graft copolymer can include a Reaction 1, where one or more acrylamide monomers, one or more dextrans, and one or more catalysts are contacted and/or reacted to make the graft copolymer of dextran and polyacrylamide. In another embodiment, the graft copolymer of dextran and polyacrylamide can be made by solution polymerization using ceric nitrate as the redox initiator.

The acrylamides monomers and dextran can be contacted in weight ratios that vary widely. For example, the weight ratio of acrylamide monomers to dextran can be from about 70 wt % about 82 wt % of acrylamide monomers to about 18 wt % to about 30 wt % of dextran, about 89 wt % to about 95 wt % of acrylamide monomers to about 5 wt % to about 11 wt % of dextran The one or more acrylamide monomers can be provided to Reaction 1 in various forms. For example, the acrylamide monomers can be in the form of a solid, solution, dispersion, or an emulsion. In another example, the acrylamide monomers can be provided to Reaction 1 in an aqueous solution from a low of about 10 wt % about, 20 wt %, or about 30 wt %, to a high of about 50 wt %, about 60 wt %, or about 70 wt %, based on the total weight of the polyacrylamide and the water. In another example, the acrylamide monomers can be provided to Reaction 1 in an aqueous solution from about 20 wt % to about 70 wt %, about 35 wt % to about 40 wt %, about 40 wt % to about 45 wt %, or about 30 wt % to about 50 wt %, based on the total weight of the acrylamide monomer and the water.

The one or more acrylamide monomers can be contacted with the dextran and the radical initiator in a weight percent that varies widely. For example, the one or more acrylamide monomers can be contacted with the dextran and the radical initiator in a weight percent from a low of about 5 wt %, about 10 wt % or about 20 wt %, to a high of about 70 wt %, about 80 wt % or about 95 wt %, based on the total weight of the acrylamide monomers, dextran, and a radical initiator. In another example, the one or more acrylamide monomers can be contacted with the dextran and the radical initiator in a weight percent from about 5 wt % to about 95 wt %, about 70 wt % to about 90 wt %, about 10 wt % to about 30 wt %, about 40 wt % to about 70 wt %, based on the total weight of the acrylamide monomers, dextran, and a radical initiator.

The dextran can be provided to Reaction 1 in various forms. For example, the dextran can be in the form of a solid, solution, dispersion, or an emulsion. In another example, the dextran can be provided to Reaction 1 in an aqueous solution from a low of about 0.25 wt % about, 1 wt %, or about 5 wt %, to a high of about 60 wt %, about 70 wt %, or about 90 wt %, based on the total weight of the dextran and the water. In another example, the dextran can be provided to Reaction 1 in an aqueous solution from about 0.25 wt % to about 70.0 wt %, about 0.5 wt % to about 2.0 wt %, about 1.0 wt % to about 3.0 wt %, about 1.0 wt % to about 12.0 wt %, about 2.0 wt % to about 20.0 wt %, about 1.5 wt % to about 14.5 wt %, about 10.0 wt % to about 30.0 wt %, about 20.0 wt % to about 40.0 wt %, about 30.0 wt % to about 80.0 wt %, about 50.0 wt % to about 90.0 wt %, based on the total weight of the dextran and the water.

The dextran can be contacted with the one or more acrylamide monomers and the radical initiator in a weight percent that varies widely. For example, the dextran can be contacted with the one or more acrylamide monomers and the radical initiator in a weight percent from a low of about 5 wt %, about 10 wt % or about 20 wt %, to a high of about 70 wt %, about 80 wt %, or about wt %, based on the total weight of the acrylamide monomers, dextran, and a radical initiator. In another example, the dextran can be contacted with the one or more acrylamide monomers and the radical initiator in a weight percent from about 5 wt % to about 95 wt %, about 70 wt % to about 90 wt %, about 10 wt % to about 30 wt %, about 40 wt % to about 70 wt %, based on the total weight of the acrylamide monomers, dextran, and a radical initiator.

The one or more catalysts or redox initiators can include, but are not limited to: ceric nitrate, cerium (IV) compounds, cerium (IV) carboxymethyl cellulose, ammonium cerium (IV) nitrate, ceric ammonium nitrate, cerium (IV) sulfate, ceric ammonium sulfate, iron (II)-hydrogen peroxide (Fenton reagent), Cobalt (III) acetylacetonate complex salts, Co(II)-potassium monopersulfate, sodium sulfite-ammonium persulfate, azobisisobutyronitrile (AIBN), potassium persulfate, ammonium persulfate, benzoyl peroxide, and combinations thereof.

The one or more catalysts or redox initiators can be provided to Reaction 1 in various forms. For example, the catalysts or redox initiators can be in the form of a solid, solution, dispersion, or an emulsion. In another example, the catalysts or redox initiators can be provided to Reaction 1 in a weight percent from a low of about 0.01 wt % about, 0.1 wt %, or about 0.2 wt %, to a high of about 1 wt %, about 2 wt %, or about 5 wt %, based on the total weight of the Reaction 1 or based on the total weight of the catalysts or redox initiators, acrylamides monomers, and dextran. In another example, the catalysts or redox initiators can be provided to Reaction 1 in a weight percent from low of about 0.01 wt % to about 0.1 wt %, 0.01 wt % to about 5 wt %, about wt % to about 1 wt %, about 0.1 wt % to about 0.3 wt %, or about 0.2 wt % to about 0.4 wt %, based on the total weight of Reaction 1 or based on the total weight of the catalysts or redox initiators, acrylamides monomers, and dextran.

Reaction 1 can further include one or more solvents. The one or more solvents for Reaction 1 can include, but are not limited to, water, methanol, ethanol, propanol, acetone, benzene, acetonitrile, chloroform, diethyl ether, methylene chloride, dimethyl formamide, ethylene glycol, triethylamine, tetrahydrofuran, and combinations thereof.

Reaction 1 can further include one or more acids. The one or more acids can include, but are not limited to, citric acid, nitric acid, hydrochloric acid, acetic acid, and combinations thereof.

Reaction 1 can be heated to a temperature from a low of about 0° C., about 15° C., and about 25° C., to a high of about 35° C., about 65° C., and about 200° C. For example, Reaction 1 can be heated to a temperature from about 25° C. to about 28° C., about 25° C. to about 35° C., about ° C. to about 45° C., 43° C. to about 78° C., about 100° C. to about 200° C. In another example, Reaction 1 can be at room temperature.

Reaction 1 can be reacted and/or stirred for a Reaction Time 1. Reaction Time 1 can be from a short of about 15 s, about 120 s, or about 300 s, to a long of about 1 h, about 10 h, or about 24 h. For example, Reaction Time 1 can be from about 1 min to about 15 min, about 5 min to about 45 min, about 1 h to about 2 h, about 1.5 h to about 5 h, or about 1.5 h to about 5.5 h.

Reaction 1 can be reacted and/or stirred in an open reaction container or a closed container. Reaction 1 can be reacted and/or stirred under a vacuum. Reaction 1 can be reacted and/or stirred under an inert atmosphere, such as He, Ne, Ar, N2, and Ar.

The graft copolymers of dextran and one or more polyacrylamides can be used in one or more well treatment compositions. For example, the well treatment composition can include, but is not limited to, one or more graft copolymers of dextran and polyacrylamides, one or more additives, and one or more solvents. In an embodiment, the well treatment composition can be a liquid, a fluid, a colloidal suspension, a dispersion, a gel, a gelled fluid, a foamed gel fluid, and combinations thereof.

The weight percent of the graft copolymer of dextran and polyacrylamide in the well treatment composition can vary widely. For example, the weight percent of the graft copolymer of dextran and polyacrylamide in the well treatment composition can be from a low of about 0.1 wt %, about 2.0 wt %, or about 5.0 wt %, to a high of about 50.0 wt %, about 70.0 wt %, or about wt %, based on the total weight of the well treatment composition or based on the total weight of the one or more graft copolymer, one or more additives, and one or more solvents. In another example, the weight percent of the graft copolymer of dextran and polyacrylamide in the well treatment composition can be from about 0.12 wt % to about 0.36 wt %, about 0.12 wt % to about wt %, about 0.10 wt % to about 0.40 wt %, about 0.11 wt % to about 0.37 wt %, about 1.0 wt % to about 90.0 wt %, about 2.0 wt % to about 10.0 wt %, about 5.0 wt % to about 15.0 wt %, about 7.0 wt % to about 20.0 wt %, about 5.0 wt % to about 60.0 wt %, about 15.0 wt % to about 25.0 wt %, about 17.0 wt % to about 54.0 wt %, about 30.0 wt % to about 54.0 wt %, about 33.0 wt % to about 48.0 wt %, about 51.0 wt % to about 54.0 wt %, or about 50.0 wt % to about 60.0 wt %, based on the total weight of the well treatment composition or based on the total weight of the one or more graft copolymer, one or more additives, and one or more solvents.

The concentration of the one or more additives in the well treatment composition can vary widely. For example, the concentration of the one or more additives in the well treatment composition can be from a low of about 0.01 wt %, about 0.5 wt %, or about 1 wt %, to a high of about 50 wt %, about 70 wt %, or about 90 wt %. In another example, the concentration of the one or more additives in the well treatment composition can be less than about 5 wt %, less than about 2 wt %, or less than about 1 wt %. In another example, the concentration of the one or more additives in the well treatment composition can be from about 0.01 wt % to about 90 wt %, 0.1 wt % to about 10 wt %, about 0.5 wt % to about 10 wt %, about 2 wt % to about 20 wt %, about 5 wt % to about 60 wt %, about 15 wt % to about 25 wt %, about 17 wt % to about 54 wt %, about 30 wt % to about 54 wt %, about 33 wt % to about 48 wt %, about 51 wt % to about 54 wt %, or about 50 wt % to about 60 wt %, based on the total weight the well treatment composition or based on the total weight of the one or more graft copolymer, one or more additives, and one or more solvents.

The amount of the one or more solvents in the well treatment composition can vary widely. For example, the amount of solvent in the well treatment composition can be from a low of about 50 wt %, about 60 wt %, or about 70 wt %, to a high of about 85 wt %, about 90 wt %, or about 98 wt %, based on the total weight the well treatment composition or based on the total weight of one or more graft copolymers, one or more additives, and one or more solvents. In another example, the well treatment composition can have a concentration of the solvent from about 50 wt % to about 98 wt %, 51 wt % to about 80 wt %, about 60 wt % to about 88 wt %, about 79 wt % to about 96 wt %, about 77 wt % to about 87 wt %, about 85 wt % to about 95 wt %, about 73 wt % to about 86 wt %, about 90 wt % to about 98 wt %, or about 95 wt % to about 98 wt %, based on the total weight the well treatment composition or based on the total weight of one or more graft copolymers, one or more additives, and one or more solvents.

The one or more solvents for well treatment composition can include, but are not limited to, water, methanol, ethanol, propanol, isopropanol, acetone, benzene, acetonitrile, chloroform, diethyl ether, methylene chloride, dimethyl formamide, ethylene glycol, propylene glycol, triethylamine, tetrahydrofuran, and combinations thereof.

The water content or concentration of water in the well treatment composition can vary widely. For example, the well treatment composition can have a concentration of the water from a low of about 50 wt %, about 60 wt %, or about 70 wt %, to a high of about 85 wt %, about 90 wt %, or about 98 wt %, based on the total weight the well treatment composition or based on the total weight of one or more graft copolymer, one or more additives, and water. In another example, the well treatment composition can have a concentration of the water from about 50 wt % to about 98 wt %, 51 wt % to about 80 wt %, about 60 wt % to about 88 wt %, about 79 wt % to about 96 wt %, about 77 wt % to about 87 wt %, about 85 wt % to about 95 wt %, about 73 wt % to about 86 wt %, about 90 wt % to about 98 wt %, or about 95 wt % to about 98 wt %, based on the total weight the well treatment composition or based on the total weight of one or more graft copolymer, one or more additives, and water. The water can be provided to well treatment composition in many forms. For example, the water can include fresh water, brine, aqueous-based foams, water-alcohol mixtures, and combinations thereof.

The well treatment composition can have a viscosity that varies widely. For example, the well treatment composition can have a viscosity from a low of about 0.5 centipoise (cP), about 1.0 cP, or about 1.2 cP, to a high of about 10.0 cP, about 100.0 cP, or about 900.0 cP. In another example, the well treatment composition can have a viscosity from about 0.5 cP to about 1.0 cP, about 0.5 cP to about 10 cP, about 1.0 cP to about 2.0 cP, about 1.5 cP to about 2.2 cP, about 1.0 cP to about 100.0 cP, about 2.0 cP to about 10 cP, about 10.0 cP to about 100.0 cP, about 20.0 cP to about 200.0 cP, about 200.0 cP to about 500.0 cP, about 400.0 cP to about 800.0 cP, about 60.0 cP to about 400.0 cP, about 301.0 cP to about 698.0 cP, or about 500.0 cP to about 899.0 cP. The viscosity of the well treatment composition can be measured at 511 per second at temperature from about 26.7° C. (80° F.) to about 48.9° C. (120° F.). In another example, the well treatment composition can be a slickwater composition, non-crosslinked composition, or crosslinked composition.

The one or more additives can include, but are not limited to: one or more friction reducers, one or more viscosifiers, one or more breakers, one or more acids, one or more base, one or more salts, one or more biocides, one or more scale inhibitors, one or more deflocculants, one or more proppants, one or more surfactants, one or more chelating agents, one or more alcohols, one or more emulsifiers, one or more non-emulsifiers, one or more mineral control agents, one or more silt suspenders, one or more corrosion inhibitors, one or more foaming agents, one or more antifoam agents, one or more $H_2S$ scavengers, one or more $O_2$ scavengers, one or more crosslinking agents, one or more surface tension reducers, one or more buffers, one or more clay stabilizers, one or more fluid loss additives, one or more temperature stabilizers, one or more diverting agents, one or more paraffin inhibitors, and one or more asphaltene inhibitors.

The one or more friction reducers can include, but are not limited to: graft copolymer of dextran and polyacrylamide, polyacrylates, polyacrylate derivatives, polyacrylate copolymers, polymethacrylates, polymethacrylate derivatives, polymethacrylate copolymers, polyacrylamide, polyacrylamide derivatives, polyacrylamide copolymers, acrylamide copolymers, polysaccharides, polysaccharide derivatives, polysaccharide copolymers, superabsorbent polymers, 2-acrylamido-2-methylpropane sulfonic acid (AMPS), acrylamido tertiary butyl sulfonic acid (ATBS), 2-(meth)acrylamido-2-methylpropane sulfonic acid, 2-amino-2-methyl-1-propanol (AMP), N,N-dimethylacrylamide (DMF), vinyl sulfonic acid, N-vinyl acetamide, N-vinyl formamide, itaconic acid, methacrylic acid, acrylic acid ester, methacrylic acid ester, acrylic acid, vinyl acetate, ethoxylated-2-hydroxyethyl acrylate, ethoxylated-2-hydroxyethyl methacrylate, 2-hydroxyethyl acrylate. 2-hydroxyethylmethyl methacrylate, 2-hydroxypropyl acrylate, 2-hydroxypropyl methacrylate, hydroxymethyl styrene, a salt of any of the foregoing, and any combination thereof.

The one or more viscosifiers can include, but are not limited to: galactomannan gums, guars, hydroxypropyl guar, carboxymethyl hydroxypropyl guar, derivatized guars, cellulose and cellulose derivatives, starch, starch derivatives, xanthan, derivatized xanthan, guar gum, guar gum derivative, locust bean gum, welan gum, karaya gum, xanthan gum, scleroglucan, diutan, cellulose, cellulose derivatives, hydroxyethyl cellulose, carboxymethyl hydroxyethyl cellulose, carboxymethyl cellulose, di alkyl carboxymethyl cellulose, and phosphomannans. In an embodiment, the viscosifier can be in the form of dry powder, carried (suspended) or dissolved in a liquid, such as water.

The one or more breakers can include, but are not limited to, ammonium persulfate, sodium persulfate, calcium peroxide, ammonium peroxydisulfate, and combinations thereof.

The one or more acids can include, but are not limited to, citric acid, nitric acid, hydrochloric acid, acetic acid, and combinations thereof. The one or more bases can include, but are not limited to, sodium hydroxide, potassium hydroxide, sodium phosphate, and combinations thereof. The pH of the well treatment composition can vary widely. For example, the well treatment composition can have a pH from about 5 to about 12, about 7.5 to about 1-1 about 7.0 to about 10, or about 6.0 to about 9.0.

The one or more salts can include, but are not limited to, one or more borate salts, sodium bicarbonate monosodium phosphate, disodium phosphate, sodium tripolyphosphate, one or more borate salts, sodium chloride, sodium carbonate, potassium carbonate, and combinations thereof.

The one or more biocides can include, but are not limited to: phenoxyethanol, ethyl hexyl glycerine, benzyl alcohol, methyl chloroiothiazolinone, methyl isothiazolinone, methyl paraben, ethyl paraben, propylene glycol, bronopol, benzoic acid, imidazolinidyl urea, a 2,2-dibromo-3-nitrilopropionamide, '2'-bronco-2-nitro-1,3-propane diol, and combinations thereof.

The one or more scale inhibitors can include, but are not limited to, phosphine hexametaphosphate, sodium hexametaphosphate, sodium tripolyphosphate, inorganic polyphosphates, hydroxy ethylidene diphosphonic acid, butane-tri carboxylic acid, phosphonates, itaconic acid, 3-allyloxy-2-hydroxy-propionic acid, and combinations thereof.

The one or more deflocculants can include, but are not limited to: anionic polyelectrolyte, such as acrylates, polyphosphates, lignosulfonates, tannic acid derivates, and combinations thereof. The deflocculants can inhibit a colloid from falling out of suspension or to thin suspensions or slurries. The deflocculants can also be used to reduce viscosity of clay-based fluids.

The one or more proppants can include natural or synthetic proppants. For example, the proppants can include, but are not limited to, glass beads, ceramic beads, sand, gravel, and bauxite. The proppants can be coated or contain chemicals. For example, the proppant can be resin coated (curable), or pre-cured resin coated. 0.1n an embodiment, more than one can be used sequentiality or in mixtures of different sizes or different materials. The proppant can be any suitable shape, including substantially spherical, fibrous, cubic, polygonal, and combinations thereof.

In an embodiment, the one or more proppants can be added to the well treatment composition widely varying quantities. For example, the one or more proppants can be added to the well treatment composition from a low of about 0.001 pounds of proppant per gallon of well treatment composition (lb/gal), about 0.10 lb/gal, or about 1.0 lb/gal, to a high of about 10.0 lb/gal, about 20.0 lb/gal, or about 30.0 lb/gal. In another example, the one or more proppants can be added to the well treatment composition from a low of about 0.001 lb/gal to about 0.10 lb/gal, about 0.011 lb/gal to about 30.0 lb/gal, about 0.010 lb/gal to about 0.50 lb/gal, about 0.05 lb/gal to about 1.0 lb/gal, about 0.02 lb/gal to about 0.10 lb/gal, about 5.0 lb/gal to about 10.0 lb/gal, or about 7.0 lb/gal to about 15.0 lb/gal in another example, the well treatment composition can be free of proppants.

The one or more surfactants can include, but are not limited to: ethoxylated amines, ethoxylated long-chain alcohols, polyglucosides, alkyl ammonium bromides, alkyl sulfonates, alkoxylated sulfates, alkyl ether sulfates, alkyl ester sulfonates, alpha olefin sulfonates, linear al alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sodium xylene sulfonate, sodium dodecyl diphenyl ether di sulfonate, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols hydroxysultaines, ethoxylated dodecanol, alkyl ammonium bromides, cetyl trimethyl ammonium bromide, methyl sulfonate, heptyl sulfonate, decylbenzene sulfonate, dodecylbenzene sulfonate, cocoamidopropyl hydroxysultaine, lauramidopropyl hydroxysultaine, lauryl hydroxysultaine, and combinations thereof. The one or more surfactants can be anionic, cationic, zwitterionic, amphoteric, or nonionic.

The one or more corrosion inhibitors can include, but are not limited to: inorganic chromates; inorganic nitrates; molybdates; organic nitrates; anthranilic acid; thiols; organic phosphonates; organic carboxylates; cinnamaldehyde; dicinnamaldehyde; 5-phenyl-2,4-pentadienal; 7-phenyl-2,4,6-heptatrienal, and combinations thereof The one or more chelating agents can include, but are not limited to: ethylenediaminetetracetic acid (EDTA), trimethylenetetramene, L-glutamic acid N,N,-diacetic acid; a salt of L-glutamic acid N,N,-diacetic acid; methylglycine N,N,-diacetic acid; a salt of methylglycine N,N,-diacetic acid; N-hydroxyethyl ethylenedi amine N,N',N'-triacetic acid; a salt of N-hydroxyethyl ethylenediamine N,N',N'-triacetic acid; N-(phosphonomethyl)iminodiacetic acid; a salt of N-(phosphonomethyl)iminodiacetic acid; a phosphonic acid; a salt of phosphonic acid; and any combination thereof.

The method of using the well treatment composition can include, but is not limited to, injecting a well treatment composition containing the graft copolymer of the dextran and polyacrylamide into a wellbore. The well treatment composition can be injected and/or pumped through the wellbore at such a velocity to fracture a subterranean formation to stimulate hydrocarbon production. After a period of time, the viscosity of the well treatment composition can lessen through the chemical action of the one or more breakers. After the well treatment composition has reached a desirable viscosity, it can be pumped and/or retrieved from the wellbore. In an embodiment, the well treatment composition can be used in a hydraulic fracturing application before, with, or after other well treatment compositions. In an embodiment, the well treatment composition can be used in any well treatment where friction reduction is desired, which can include, but is not limited to, stimulation and completion operations. For example, the well treatment composition can be injected at a pressure effective to create one or more fractures in the subterranean formation. Depending on the type of well treatment composition utilized, various additives can also be added to the fracturing fluid to change the physical properties of the fluid or to serve a certain beneficial function. In one embodiment, a proppant can be added to keep the fractures open after the fracturing operation. In another embodiment, fluid loss agents can be added to partially seal off the more porous sections of the formation so that the fracturing occurs in the less porous strata. In some embodiments, it can be desired to foam the well treatment composition using a gas, such as air, nitrogen, or carbon dioxide.

In an embodiment, a method of treating a wellbore can include, but is not limited to: injecting into a wellbore: a first well treatment composition that can include one or more graft copolymer of the dextran and polyacrylamide; and a second well treatment composition that can include one or more breakers. In an embodiment, the second well treatment corn position can be injected into the wellbore substantially at the same time as the first well treatment composition. In an embodiment, the second well treatment composition can be injected into the well bore after the first well treatment composition has been injected into the wellbore. In an embodiment, the first well treatment composition and the second well treatment composition are at least partially mixed and injected into the wellbore.

In an embodiment, the graft copolymers of the dextran and polyacrylamide and/or the wellbore treatment compositions can be used for carrying out a variety of subterranean treatments, including, but not limited to, drilling operations, fracturing treatments, and completion operations gravel packing). In an embodiment, the graft copolymers of the dextran and polyacrylamide and/or the wellbore treatment compositions can be used in treating a portion of a subterranean formation. In an embodiment, the graft copolymers of the dextran and polyacrylamide and/or the wellbore treatment compositions can be used in or injected with fresh water, salt water or brines. In an embodiment, the well treatment compositions can be handled or processed in any manner as necessary or desired. In an embodiment, the well treatment composition can be disposed of, processed for environmental remediation, or recycled.

The well treatment composition can be pumped through the wellbore into subterranean formation at a pumping rate from a low of about 20 barrels per minute (bpm), about 25 bpm, about bpm, to a high of about 150 bpm, about 175 bpm, or about 225 bpm. For example, the well treatment composition can be pumped through the wellbore into subterranean formation at a pumping rate from about 50 bpm to about 120 bpm, about 21 bpm to about 149 bpm, about 25 bpm to about 50 bpm, about 38 bpm to about 130 bpm, about 67 bpm to about 176 bpm, or about 34 bpm to about 133 bpm.

The well treatment composition can be injected into the wellbore at widely varying pressures. For example, the well treatment composition can be injected into the wellbore at a pressure of at least 1,000 psi, at least 2,000 psi, at least 3,000 psi, at least 4,000 psi, at least 5,000 psi, at least 5,500 psi, at least 6,000 psi, at least 6,500 psi, at least 7,000 psi. In another example, the well treatment composition can be injected into the wellbore at a pressure from about 1,000 psi to about 2,000 psi, about 1,000 psi to about 7,000 psi, about 2,000 psi to about 5,000 psi, or about 3,000 psi to about 6,000 psi.

The graft copolymers of the dextran and polyacrylamide and/or the wellbore treatment compositions can be used in widely varying temperature ranges. For example, graft copolymers of the dextran and polyacrylamide and/or the well bore treatment compositions can be used in a temperature range from about 2° C. to about 205 about 20° C. to about 250° C., about 25° C. to about 149° C., or about 70° C. to about 200° C.

In an embodiment, the one or more breakers can reduce the viscosity of the well treatment composition to less than about 1.5 cP at a shear rate of 100 s$^{-1}$, about 2 cP at a shear rate of 100 s$^{-1}$, about 10 cP at a shear rate of 100 s$^{-1}$, about 5 cP at a shear rate of 100 s$^{-1}$, about 20 cP at a shear rate of 100 s$^{-1}$, about 10 cP at a shear rate of 100 s$^{-1}$, or about 3 cP at a shear rate of 100 s$^{-1}$. In another embodiment, the one or more breakers can reduce the viscosity of the well treatment composition to a range from about 1.0 cP to about 5 cP at a shear rate of 100 s$^{-1}$, about 1.5 cP to about 4 cP at a shear rate of 100 s$^{-1}$, about 2.0 cP to about 10 cP at a shear rate of 100 s$^{-1}$, or about cP to about 20 cP at a shear rate of 100 s$^{-1}$. In an embodiment, the decrease in the viscosity of the well treatment composition can allow for easier recovery of the well treatment composition.

EXAMPLES

To provide a better understanding of the foregoing discussion, the following non-limiting examples are offered. Although the examples can be directed to specific embodiments, they are not to be viewed as limiting the invention in any specific respect. Examples of the graft copolymers of dextran and polyacrylamide and reaction conditions for making them are shown in Tables 1-6.

TABLE 1

Example 1 of Graft copolymers of dextran and polyacrylamide

| Steps | Description | Quantities |
|---|---|---|
| Step 1 | Prepare dextran solution | 1.9459 g Dextran; 200 mL water |
| Step 2 | N2 Purge dextran solution | |
| Step 3 | Add ceric ammonium nitrate (0.0625M) by syringe | 0.32 mL |
| Step 4 | Stir at room temperature (15 min) | |
| Step 5 | Add acrylamide solution (40 w/v %) by syringe | 3.20 mL |
| Step 6a | Stir at room temperature (4 h) | |
| Step 6b | NMR spectroscopy at time points | |
| Step 7 | Precipitation into methanol (acetone) | |
| Step 8 | Dry under vacuum | |
| Step 9 | Final Analysis | |
| | Final dry wight of polymer | |
| | NMR of product | |
| | Submit for GPC | |

Reaction Notes:
Reaction vessel: 500 mL 3-neck round bottom flask
Method of purging dextran solution:
Rapid stirring with $N_2$ purging across head space
Acrylamide solution was also purged before addition with $N_2$ by submerging needle into solution for~5 min.
Time points: 15 min, 1 h, 2 h, and 4 h
Temperature: No significant exotherm observed
Reaction #1 Yield:
Yield: 1.8610 g
% Yield = [mass product/(mass dextran + mass monomer)] × 100
% Yield: 57.7%
Precipitation technique successfully removed acrylamide monomer
Small amount of grafted polyacrylamide onto dextran

TABLE 2

Example 2 of Graft copolymers of dextran and polyacrylamide

| Steps | Description | Quantities |
|---|---|---|
| Step 1 | Prepare dextran solution | 1.9459 g Dextran; 200 mL water |
| Step 2 | N2 Purge dextran solution | |
| Step 3 | Add ceric ammonium nitrate (0.0625M) by syringe | 1.870 mL |
| Step 4 | Stir at room temperature (15 min) | |
| Step 5 | Add acrylamide solution (40 w/v %) by syringe | 3.20 mL |
| Step 6a | Stir at room temperature (4 h) | |
| Step 6b | NMR spectroscopy at time points | |
| Step 7 | Precipitation into acetone | |
| Step 8 | Dry under vacuum | |
| Step 9 | Final Analysis | |
| | Final dry wight of polymer | |
| | NMR of product | |
| | Submit for GPC | |

Reaction Notes:
Reaction vessel: 500 mL 3-neck round bottom flask
Method of purging dextran solution:
$N_2$ purging using needle submerged into solution
Acrylamide solution was also purged before addition with $N_2$ by submerging needle into solution for~5 min.
Time points: 15 min, 1 h, 2 h, and 4 h
Temperature: No significant exotherm observed
Reaction #1 Yield:
Yield: 1.8791 g
% Yield = [mass product/(mass dextran + mass monomer)] × 100
% Yield: 58.3%
Precipitation technique successfully removed acrylamide monomer
Small amount of grafted polyacrylamide onto dextran

TABLE 3

Examples 3 and 4 of Graft copolymers of dextran and polyacrylamide

| Steps | Description | Quantities |
|---|---|---|
| Step 1 | Prepare dextran solution | 1.0000 g Dextran; 100 mL water |
| Step 2 | Add acrylamide solution (40 w/v %) by syringe | 19.94 mL |
| Step 3 | Purge with N2 (needle purge) | |
| Step 4 | Warm to 28° C. | |
| Step 5 | Add ceric ammonium nitrate (0.0625M) in 1M $HNO_3$ | 0.585 mL; 0.020 g Ce(IV) |
| Step 6a | Stir at 28 C. (4 h) | |
| Step 6b | NMR spectroscopy at end of reaction | |
| Step 7 | Precipitation into acetone | |
| Step 8 | Dry under vacuum | |
| Step 9 | Final Analysis<br>Final dry wight of polymer<br>NMR of product<br>Submit for GPC | |

Reaction Notes:
Reaction vessel: 500 mL 3-neck round bottom flask
Method of purging dextran/acrylamide solution:
Rapid stirring with $N_2$ needle purge in solution for 30 min
Ceric solution was also purged before addition with $N_2$
Time points: 4 h (Instead of 3 h)
Temperature: Slight exotherm observed peaking at 10 min (26.8° C. to 31.1° C.).
Viscosity becomes too much for magnetic stir bar after about 40 min.
The material became gel-like with a very high viscosity
Limited time points to final time point.
Conversion was calculated based on resonances for monomer and for polyamide.
Final conversion: 75.5%
Precipitation
Added 250 mL DI water with hydroquinone (0.08 g) to reaction solution
Manually mixed for~1 h
Precipitated into 2 L acetone
Near the end, gel material was still noticed in reaction flask and clumped into acetone beaker!
Attempted to dry in vacuum over night, but formed clear rubbery material
$2^{nd}$ attempt
Attempted to dissolve rubbery material
Added portion-wise up to 400 mL of DI-water
Still not fully dissolved
Briefly Heated to 50 C.
Still not fully dissolved
At r.t. stirred over night
Still not fully dissolved
Decanted solution from gel
Decanted solution
While stirring slowly added 400 mL acetone
Nice white precipitate formed
Collected by filtration
Washed 3 × with 100 mL acetone
Currently: Drying under vacuum
Gel
Added an additional 400 mL DI water
Currently: stirring over night
Conversion comparison:
Reaction 3: 47.4%
Reaction 4: 75.5%
Longer reaction times (3 h to 4 h) could have . . .
Increased amount of grafted materials
Increased molecular weight
Caused crosslinking to occur
Thus lower conversions might be beneficial

TABLE 4

Example 5 of Graft copolymers of dextran and polyacrylamide

| Steps | Description | Quantities |
|---|---|---|
| Step 1 | Prepare dextran solution | 1.0000 g Dextran; 100 mL water |
| Step 2 | Add acrylamide solution (40 w/v %) by syringe | 19.94 mL |
| Step 3 | Add 100 mL DI-water to addition funnel | |

TABLE 4-continued

Example 5 of Graft copolymers of dextran and polyacrylamide

| Steps | Description | Quantities |
|---|---|---|
| Step 4 | Purge with N2 (needle purge) | |
| Step 5 | Warm to 28 C. | |
| Step 6 | Add ceric ammonium nitrate (0.0625M) in 1M HNO3 | 0.585 mL; 0.02 g Ce(IV) |
| Step 7 | Stir at 28° C. (4 h) | |
| Step 8 | Add dropwise DI-water from addition funnel starting after 5 min of reaction | |
| Step 9 | NMR spectroscopy at end of reaction | |
| Step 10 | Precipitation into acetone | |
| Step 11 | Dry under vacuum | |
| Step 12 | Final Analysis<br>Final dry wight of polymer<br>NMR of product | |

Reaction Notes:
Reaction vessel:
1 L clam-shell reactor
Mechanical stirrer
Addition Funnel
Purge line for both reactor and addition funnel
Temperature: Slight initial exotherm observed
Added DI-water dropwise staring after 5 min (rate:~5.5 mL/min)
Solution becomes more viscous (shear thickening), but NO gelling
Added 200 mL (with hydroquinone) at the end of the reaction
Conversion was calculated based on resonances for monomer and for polyamide.
Final conversion: 68.2%
Results
Reaction #1 Yield:
Yield: 14.4 g
% Yield = [mass product/(mass dextran + mass monomer)] × 100
% Yield: 160.0%
Thermogravimetric analysis (TGA) shows 32.8 wt % loss due to water
Actual Yield = [(mass product × 0.328)/(mass dextran + mass monomer)] × 100
ACTUAL Yield: 52.5%
Precipitation technique successfully removed acrylamide monomer
Trace amount of acrylamide
But still contains a large amount of water

TABLE 5

Example 4 of Graft copolymers of dextran and polyacrylamide

| Steps | Quantities |
|---|---|
| Dextran | 11.11 g; 0.068513 mol AGU |
| Desired Initial Dextran Conc. | 10 g/L<br>0.061667 mol AGU/L |
| Volume DI-Water | 1.111 L |
| Acrylamide Solution (40%) | 221.58 mL |
| Acrylamide | 88.6317 g; 1.2469 mol |
| Ce(IV) solution | 6.502 mL |
| Ce(IV) | 0.223 g; 0.0004064 mol |
| 1M HNO3 | 6.502 mL |
| Ce(IV) Conc. | 0.0625 mol/L |
| Volume DI-Water (2nd) | 1.111 L |
| Hydroquinone | 0.004064 mol; 0.4474 g |
| Volume DI-Water | 1.111 L |

Reaction Notes:
Reaction vessel:
5 L 3-neck rb flask
Mechanical stirrer (IKA RW20 digital)
Two prong shear paddle
Heating
J-KEM Scientific
Electric mantel
Additional water
2 L round bottom flask
Ismatic peristaltic pump (set to 10 mL/min)
Purge
Purged headspace on additional water reservoir (2 L rb flask) over night
Purged reactor with dextran and acrylamide by bubbling N2 for 30 min
Then slight positive pressure in headspace during reaction
Purged initiator solution by bubbling N2 for 5 min Temperature:
Started at 31° C.
Exotherm peak of 34.4° C. at 40 min
Added DI-water
10 mL/min starting at 5 min
Solution becomes more viscous, but NO gelling
Added hydroquinone solution at the end of the reaction
Also 0.89 mL of biocide was added
Conversion was calculated based on resonances for monomer and for polyamide.
Final conversion: 68.3%
TGA of Final Solution
Procedure
N2 purge
Heated to 120° C. at 10° C./min
Isotherm for 15 min at 120° C.
Heated to 800° C. at 10° C./min
Results
97.19 wt % loss at 120° C.
2.81 wt % residual at temp
Reaction Yield:
Calculated Yield
Yield = mass dextran + mass polyacrylamide
72.03 g
Concentration
Concentration = calculated yield mass / volume of reaction solution
Concentration = 0.02021 g/mL or 2.02 w/v %
TGA shows 2.81 wt % residual after heating to 120° C.

TABLE 6

Break test at 120° F. with 0.25 gallons per thousand (gpt) GB-701 (Persulfate)

| Time (min) | temp (° F.) | Viscosity (cP @ 511/sec) |
|---|---|---|
| Graft copolymer of dextran and polyacrylamide at 50 gpt | | |
| 3 | 80.5 | 1.8 |
| 5 | 86 | 1.7 |
| 10 | 114 | 1.3 |
| 15 | 122 | 1.1 |
| FR-515 @ 0.5 gpt | | |
| 3 | 87.6 | 2.8 |
| 5 | 102.8 | 2.4 |
| 10 | 120.2 | 2 |
| 15 | 122.1 | 1.9 |
| 20 | 118.9 | 1.9 |
| 25 | 123.4 | 1.9 |
| 35 | 119.2 | 1.9 |

One of ordinary skill in the art will readily appreciate that alternate but functionally equivalent components, materials, designs, and equipment can be used. The inclusion of additional elements can be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

As used herein, the terms "polymer," "polymers," "polymeric," and similar terms are used in their ordinary sense as understood by one skilled in the art, and thus can be used herein to refer to or describe a large molecule (or group of such molecules) that contains recurring units. Polymers can be formed in various ways, including by polymerizing monomers and/or by chemically modifying one or more recurring units of a precursor polymer. A polymer can be a "homopolymer" comprising substantially identical recurring units formed by, e.g., polymerizing a particular monomer. A polymer can also be a "copolymer" comprising two or more different recurring units formed by, e.g., copolymerizing two or more different monomers, and/or by chemically modifying one or more recurring units of a precursor polymer.

The terms "graft copolymer", "branched copolymer" and the like herein generally refer to a copolymer comprising a "backbone" (or "main chain") and side chains branching from the backbone. The side chains are structurally distinct from the backbone.

As used herein, the term "breaker" refers to any compound or mixture of compounds which reduces the viscosity of the well treatment composition. In exemplary embodiments, the breaker is an iron-containing compound, for example a ferrous compound, ferrous salt, ferric compound or ferric salt. In exemplary embodiments, the ferrous salt is, for example, a ferrous salt having an organic anion, a ferrous salt having an inorganic anion, or a mixture thereof. In exemplary embodiments, the breaker or ferrous salt is ferrous chloride, ferrous bromide, ferrous fluoride, ferrous sulfate, ammonium iron sulfate and combinations thereof. In exemplary embodiments, the ferrous salt breaker comprises ferrous sulfate.

The term "treatment", or "treating", refers to any subterranean operation that uses a fluid composition in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), to increase production rates from or injection rates into a hydrocarbon reservoir. The fracturing methods otherwise use conventional techniques known in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits can be the values from the examples. Certain lower limits, upper limits and ranges appear in at least one claims below. All numerical values are "about" or "approximately" the indicated value, and consider experimental error and variations that would be expected by a person having ordinary skill in the art.

Although the invention has been described with reference to the above examples, it will be understood that modifications and variations are encompassed within the spirit and scope of the invention. Accordingly, the invention is limited only by the following claims.

REFERENCES

1. Carman P S, Cawiezel K. Successful breaker optimization for polyacrylamide friction reducers used in slickwater fracturing. SPE Hydraul Fract Technol Conference, College Station, Texas, Soc Pet Eng. 2007.
2. Woodroof, R. A. and Anderson, R. W. 1977. Synthetic Polymer Friction Reducers Can Cause Formation Damage. Paper SPE-6812-MS presented at the SPE Annual Fall Technical Conference and Exhibition, Denver, Colorado, 9-12 October.

What is claimed is:

1. A graft copolymer composition comprising:
   a graft copolymer, wherein the graft copolymer comprises:
      dextran, wherein the dextran is a backbone polymer comprising about 10_wt % to about 50 wt % of the graft copolymer, based on the total weight of the graft copolymer; and
      polyacrylamide, wherein the polyacrylamide is a side chain polymer comprising about 50 wt % to about 90 wt % of the graft copolymer, based on the total weight of the graft copolymer, wherein the graft copolymer has a weight-average molecular weight from about 1,000,000 g/mol to about 1,500,000 g/mol; and
   water, wherein the graft copolymer composition has a weight percent of the graft copolymer from about 0.12 to about 0.36 and wherein the graft copolymer composition has viscosity from about 0.5 cP to about 10 cP at a temperature of about 48.9° C.

2. A graft copolymer comprising:
dextran, wherein the dextran is a backbone polymer comprising about 70 wt % to about 82 wt % of the graft copolymer, based on the total weight of the graft copolymer; and
polyacrylamide, wherein the polyacrylamide is a side chain polymer comprising about 18 wt % to about 30 wt % of the graft copolymer, based on the total weight of the graft copolymer, wherein the graft copolymer has a weight-average molecular weight from about 1,000,000 g/mol to about 1,500,000 g/mol.

3. A graft copolymer comprising:
dextran, wherein the dextran is a backbone polymer comprises about 15 wt % to about 25 wt % of the graft copolymer, based on the total weight of the graft copolymer; and
polyacrylamide, wherein the polyacrylamide is a side chain polymer comprises about 75 wt % to about 85 wt % of the graft copolymer, based on the total weight of the graft copolymer, wherein the graft copolymer has a weight-average molecular weight from about 1,000,000 g/mol to about 1,500,000 g/mol.

* * * * *